US012721385B2

(12) United States Patent
Vito

(10) Patent No.: US 12,721,385 B2
(45) **Date of Patent: *Sep. 1, 2026**

(54) APPARATUSES, SYSTEMS AND METHODS FOR EQUIPMENT FOR PROTECTING THE HUMAN BODY BY ABSORBING AND DISSIPATING FORCES IMPARTED TO THE BODY

(71) Applicant: MATSCITECHNO LICENSING COMPANY, Kennett Square, PA (US)

(72) Inventor: Robert A. Vito, Kennett Square, PA (US)

(73) Assignee: MATSCITECHNO LICENSING COMPANY, Kennett Square, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/179,424

(22) Filed: Apr. 15, 2025

(65) Prior Publication Data

US 2025/0241385 A1 Jul. 31, 2025

Related U.S. Application Data

(63) Continuation of application No. 18/407,568, filed on Jan. 9, 2024, now Pat. No. 12,274,318, which is a continuation of application No. 15/383,770, filed on Dec. 19, 2016, now Pat. No. 11,864,599.

(60) Provisional application No. 62/269,723, filed on Dec. 18, 2015.

(51) Int. Cl.

| | |
|---|---|
| ***A41D 13/05*** | (2006.01) |
| ***A41D 13/015*** | (2006.01) |
| ***A41D 31/28*** | (2019.01) |
| ***B32B 5/26*** | (2006.01) |
| ***F41H 5/04*** | (2006.01) |

(52) U.S. Cl.

CPC ....... *A41D 13/0518* (2013.01); *A41D 13/015* (2013.01); *A41D 31/285* (2019.02); *B32B 5/26* (2013.01); *F41H 5/0478* (2013.01); *A41D 13/05* (2013.01)

(58) Field of Classification Search

CPC ............ A41D 13/0518; A41D 13/0512; A41D 13/015; A41D 13/0543; A41D 13/00; A41D 13/0562; A41D 31/285; A63B 71/12; A42B 1/08

See application file for complete search history.

(56) References Cited

U.S. PATENT DOCUMENTS

| | | | | |
|---|---|---|---|---|
| 4,513,449 A * | 4/1985 | Donzis | A41D 13/0587 | 2/24 |
| 4,525,875 A * | 7/1985 | Tomczak | A41D 13/0518 | 2/466 |
| 4,989,265 A * | 2/1991 | Nipper | A41D 13/0518 | 2/92 |

(Continued)

*Primary Examiner* — Jillian K Pierorazio

(74) *Attorney, Agent, or Firm* — Riverside Law LLP

(57) ABSTRACT

The disclosed apparatus, system and method includes at least a protective garment that prevents concussive effects on internal organs. The garment may include a garment body; and, embedded in the garment body, at least one multi-sectional pad. At least two of the multi-sections may comprise: at least one aramid layer; at least one multi-durometer foam layer having a substantially similar surface area to that provided by the at least one aramid layer; and at least one shield layer.

19 Claims, 3 Drawing Sheets

(56) References Cited

U.S. PATENT DOCUMENTS 5,020,156 A * 6/1991 Neuhalfen ............. A63B 71/12 2/92
5,245,706 A * 9/1993 Moschetti ............. A63B 71/12 2/45
5,294,181 A * 3/1994 Rose .................... A61G 5/1045 297/452.57
5,423,087 A * 6/1995 Krent ................... A41D 31/285 2/463
5,621,914 A * 4/1997 Ramone ............ A41D 13/0518 2/92
5,697,101 A * 12/1997 Aldridge ............. A41D 31/085 2/81
5,701,611 A * 12/1997 Rector .................. A63B 71/12 2/268
6,282,724 B1 * 9/2001 Abraham ............ A41D 13/015 2/455
6,295,654 B1 * 10/2001 Farrell ............... A41D 13/0158 2/108
7,765,615 B2 * 8/2010 Eastwood .......... A41D 13/0518 2/115
8,505,122 B1 * 8/2013 Green ................ A41D 13/0156 2/463
D744,168 S * 11/2015 Best ......................... D29/101.3
2002/0028325 A1 * 3/2002 Simpson ................. B32B 27/40 428/218
2003/0070209 A1 * 4/2003 Falone .................. A43B 19/00 2/463
2003/0079271 A1 * 5/2003 Gillen ................ A41D 13/0512 2/102
2003/0140400 A1 * 7/2003 Ho ........................ A42B 3/063 2/412
2003/0167560 A1 * 9/2003 LaShoto ............. A41D 13/015 2/463
2005/0241052 A1 * 11/2005 Brown ............... A41D 13/0153 2/463
2006/0048292 A1 * 3/2006 Gillen ................ A41D 13/0153 2/456
2006/0080762 A1 * 4/2006 Kobren ............. A41D 13/0518 2/463
2006/0096000 A1 * 5/2006 Romero ............ A41D 13/0568 2/22
2006/0107433 A1 * 5/2006 Olson .................... A63B 71/08 2/22
2007/0050886 A1 * 3/2007 Brassill .................. A63B 71/12 2/115
2007/0102461 A1 * 5/2007 Carstens ............. A41D 13/005 224/222
2007/0174953 A1 * 8/2007 Garneau ................ A41D 1/084 2/466
2008/0066217 A1 * 3/2008 Depreitere ............. A42B 3/124 2/412
2008/0113143 A1 * 5/2008 Taylor ..................... B32B 5/245 428/47
2008/0172779 A1 * 7/2008 Ferguson ............. A41D 31/285 2/455
2008/0201828 A1 * 8/2008 Kanavage ............ A41D 13/015 2/463
2008/0235855 A1 * 10/2008 Kobren ............. A41D 13/0518 2/463
2009/0211001 A1 * 8/2009 Weimer ................. A63B 71/12 2/463
2009/0307829 A1 * 12/2009 Onrot ................ A41D 13/0506 2/400
2010/0037374 A1 * 2/2010 Crelinsten ............. A41D 13/05 2/455
2010/0306907 A1 * 12/2010 Fiegener ................ A63B 71/12 2/113
2011/0005379 A1 * 1/2011 Wang .................... F41H 5/0471 89/914
2011/0023218 A1 * 2/2011 Syska ............... A61M 39/0208 2/455
2011/0219524 A1 * 9/2011 Perreault ........... A41D 13/0518 2/463
2011/0252549 A1 * 10/2011 Jourde .............. A41D 13/0518 2/463
2011/0314589 A1 * 12/2011 Vito ...................... F16F 1/3737 2/181
2012/0036620 A1 * 2/2012 Harris .................... A42B 3/127 2/414
2012/0060268 A1 * 3/2012 Crelinsten ............. A41D 13/05 2/463
2012/0210488 A1 * 8/2012 Blakely ............. A41D 13/0015 2/69
2012/0246788 A1 * 10/2012 Harrell .............. A41D 13/0155 2/243.1
2013/0000024 A1 * 1/2013 Perreault ........... A41D 13/0568 2/463
2013/0014318 A1 * 1/2013 Jourde .................. A63B 71/12 2/463
2013/0104302 A1 * 5/2013 Fream ............... A41D 13/0512 2/461
2013/0283511 A1 * 10/2013 Diamond ........... A41D 13/0153 2/455
2013/0305439 A1 * 11/2013 Contant ............ A41D 13/0153 2/455
2014/0000016 A1 * 1/2014 Storelli ............. A41D 13/0518 2/463
2014/0143939 A1 * 5/2014 Olivares Velasco ......................... A41D 31/125 2/414
2014/0245525 A1 * 9/2014 Turner .................. A42B 3/125 2/455
2014/0289938 A1 * 10/2014 Brown .............. A41D 13/0518 2/455
2015/0181950 A1 * 7/2015 Skottheim .......... A41D 13/0512 2/463
2015/0223547 A1 * 8/2015 Wibby .................. A42B 3/064 2/414
2017/0151486 A1 * 6/2017 Liang ................... A41D 31/285
2017/0311659 A1 * 11/2017 Guidetti ................. A41D 31/18
2019/0001215 A1 * 1/2019 Fream ................ A41D 13/0512
2019/0314707 A1 * 10/2019 Lemieux ............ A41D 13/0562
2020/0037680 A1 * 2/2020 Person ................. A41D 31/285
2020/0205491 A1 * 7/2020 Melofchik ......... A41D 13/0568
2023/0110515 A1 * 4/2023 Dierkes ............. A41D 13/0512 2/462
2024/0407482 A1 * 12/2024 Person ................... A63B 71/12
2024/0407483 A1 * 12/2024 Andes ................ A41D 13/0518

* cited by examiner

APPARATUSES, SYSTEMS AND METHODS FOR EQUIPMENT FOR PROTECTING THE HUMAN BODY BY ABSORBING AND DISSIPATING FORCES IMPARTED TO THE BODY

CROSS-REFERENCE TO RELATED APPLICATIONS

This application is a Continuation Application of U.S. application Ser. No. 18/407,568, filed Jan. 9, 2024, which is a Continuation Application of U.S. application Ser. No. 15/383,770, filed Dec. 19, 2016, which claims priority to U.S. Provisional Patent Application No. 62/269,723, filed Dec. 18, 2015, which are hereby incorporated by reference as if set forth herein in their entirety.

BACKGROUND

Field of Disclosure

The present disclosure relates to equipment, and, more specifically, to apparatuses, systems and methods for equipment for protecting the human body by absorbing and dissipating forces imparted to the body.

Description of the Background

As will be understood to the skilled artisan, commotio cordis is a concussion of the heart. This cardiac concussion at a particular point in the cardiac cycle can cause cardiac arrest and lead to death, and the condition may be particularly dangerous for youths with more deformable sternums, such as youths under the age of 18. Moreover, youths may be particularly exposed during certain activities, such as during competitive sports play. Other internal organs, such as the liver, brain, kidneys, etc., may likewise be impacted by imparted forces similar to those that may cause commotio cortis.

Distressingly, commotio cordis, although rare, continues to occur, frequently in those wearing protective equipment known in the art. Baseball, lacrosse and hockey are three common sports in which commotio cordis occurs, and these are also sports in which chest-protective equipment is frequently worn by participants, including many of those (estimated to be as many as ⅓) that suffer commotio cordis.

Accordingly, improved apparatuses, systems and methods of protecting the human body by absorbing and dissipating forces imparted to the body are needed.

SUMMARY

The disclosed apparatus, system and method includes at least a protective garment that prevents concussive effects on internal organs. The garment may include a garment body; and, embedded in the garment body, at least one multi-sectional pad. At least two of the multi-sections may comprise: at least one aramid layer; at least one multi-durometer foam layer having a substantially similar surface area to that provided by the at least one aramid layer; and at least one shield layer.

Accordingly, the disclosure provides improved apparatuses, systems and methods of protecting the human body by absorbing and dissipating forces imparted to the body.

BRIEF DESCRIPTION OF THE DRAWINGS

The description herein is made in conjunction with the attached drawings, which form a part hereof, in which like numerals represent like elements, and in which.

DETAILED DESCRIPTION

Figure 1A:
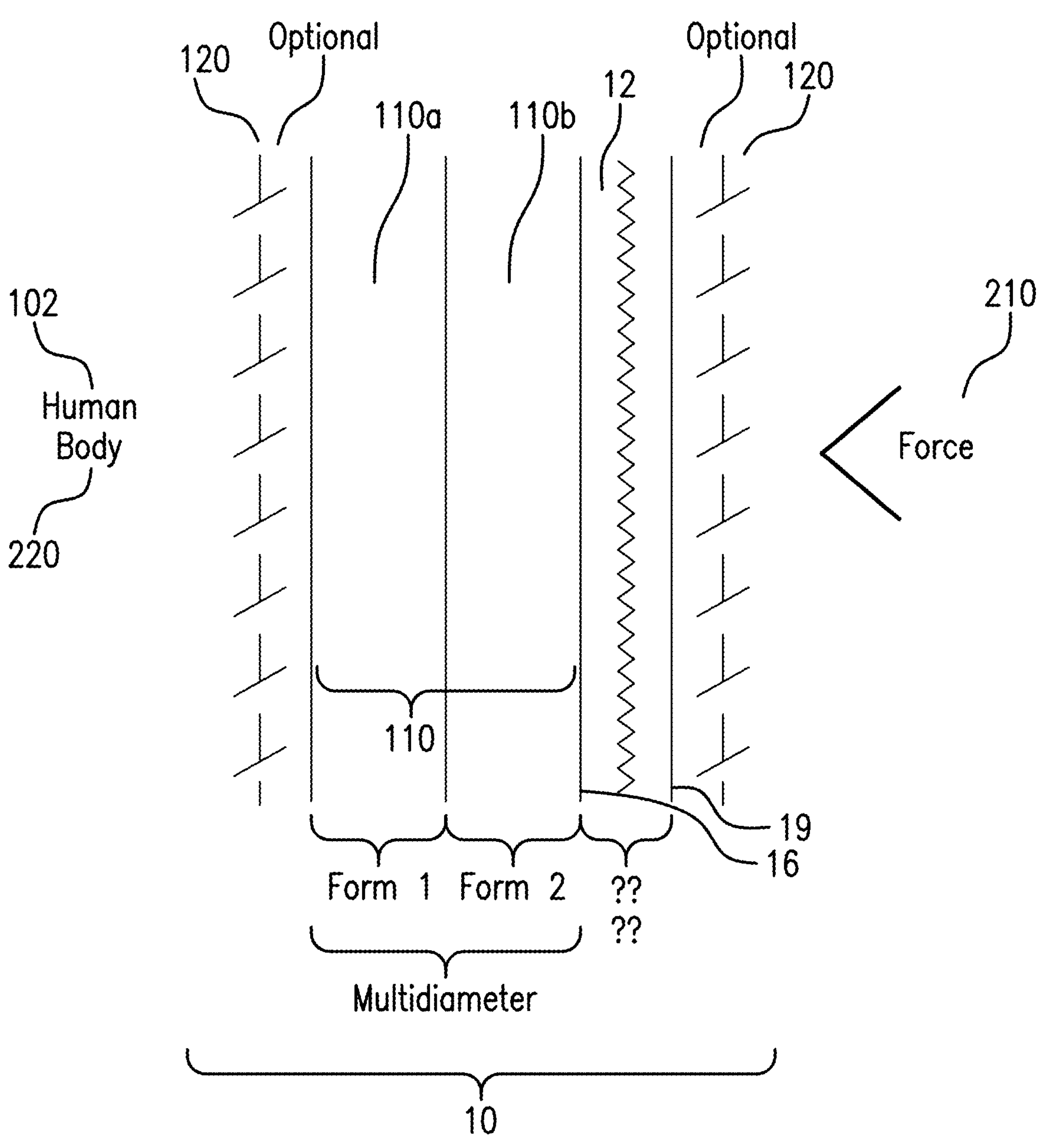
FIGS. 1A and 1B illustrate a multi-durometer protective pad.

The figures and descriptions provided herein may have been simplified to illustrate aspects that are relevant for a clear understanding of the herein described apparatuses, systems, and methods, while eliminating, for the purpose of clarity, other aspects that may be found in typical similar apparatuses, systems, and methods. Those of ordinary skill may thus recognize that other elements and/or operations may be desirable and/or necessary to implement the aspects described herein. But because such elements and operations are known in the art, and because they do not facilitate a better understanding of the present disclosure, a discussion of such elements and operations may not be provided herein. However, the present disclosure is deemed to nevertheless include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific aspects, apparatuses, elements, devices, and methods, to provide a thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to," "coupled to," or like terminology in relation to another element or layer, it may be directly on, engaged, connected or coupled to the other element or layer, or intervening elements or layers may be present. In contrast, when an element is referred to as being "directly on," "directly engaged to", "directly connected to," "directly coupled to" or like terminology in relation to another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

The disclosed embodiments provide at least protective equipment, such as chest protectors, garments, such as shirts, and the like (which may be referred to by collective terms and phrases herein throughout) 10 that serve in the prevention of concussive effects on the heart 102, cardiopulmonary system 204, internal organs and other body parts, and the like, by a received force. The concussive effects prevented by the disclosed embodiments may owe the provided functionality to the variety of layers that constitute the protective equipment. These layers may have various constituents, various thicknesses, and may be provided in various combinations that may modify the performance of the protective equipment, but which are nevertheless covered by the disclosed embodiments. For example, although an aramid layer 12 discussed herein may experience enhanced performance by having applied thereto an elastomeric coating 14, 16 on both sides thereof, those of ordinary skill in the pertinent arts will appreciate in light of the discussion herein that such coatings may be provided on only one side of the aramid layer or may be provided by various optional elastomeric components, or elastomeric combination in combination with other constituents or features, such as protective randomly distributed nanofibers and the like.

More specifically, a pad, panel, or multiple pads or panels 100*a*, 100*b*, 100*c* . . . , in addition to other arrangements (which may be referred to by collective terms or phrases herein throughout), may be provided that comprise the aforementioned coated aramid layer or layers. These apparatuses, which may be hereinafter referred to collectively as panels 100*a*, 100*b*, 100*c*, may, for example, include other layers in addition to a coated aramid layer. For example, a multidurometer layer or layers 110, 110*a*, 110*b*, such as may be formed of different durometer foams or multiple layers of foam of differing durometer, may be provided in association with a coated aramid layer. By way of non-limiting example, optimized performance may be achieved through the use 110 of foam layer or layers having dual durometers, such as a high-density foam and low-density foam in combination. By way of example, a low-density foam aspect may have a density of twelve to thirty-two pounds per cubic foot and most particularly may have a density of twenty pounds per cubic foot, while a low-density foam may have a density of three to twelve pounds per cubic foot, and most particularly nine pounds per cubic foot. These multidensity foams may form a multidurometer layer 110 that may serve to dissipate a received concussive force 210, and which may, on a face of the protective pad the outermost foam layer, be physically associated with a coated aramid layer, which coated aramid layer 12 may be most or least proximate in the protective equipment to the body 220. This arrangement is illustrated in FIGS. 1A and 1B, wherein a nine-pound per cubic foot low-density foam forms the innermost layer 110*a* of a panel, a thirty-one pound per cubic foot high density foam forms a middle layer 110*b* of the protective equipment, and a coated aramid 12 having a coating of elastomeric 14, 16 on both sides thereof forms the outermost layer of the protective equipment.

TABLE 1

| Chest protector | Accelleron ® closed cell high density foam | Airilon ® closed cell low density soft foam | Open cell memory foam | TriDur ® | ImpacShield ®, -multilayer semi-rigid polypropylene polymer | No of Impacts | No of VF | VF (%) |
|---|---|---|---|---|---|---|---|---|
| Control | | | | | | 80 | 43 | 54 |
| 1 | 6 | | | .35 | .33 | 33 | 11 | 33 |
| 3 | 6 | | | .35 | | 33 | 18 | 54 |
| 6 | 10 | 8 | | .35 | .33 | 25 | 2 | 8 |
| 7 | 6 | 6 | | .35 | .33 | 25 | 5 | 20 |
| 8 | 10 | 10 | | .35 | .33 | 20 | 4 | 20 |
| 9 | 10 | 10 | | .35 | .67 | 20 | 1 | 5 |
| 10 | | | 12 | .35 | | 20 | 10 | 50 |
| 11 | | | 12 | .35 | .33 | 15 | 9 | 60 |
| 12 | | | 12 | .35 | | 15 | 6 | 40 |
| 13 | 6 | | 8 | .35 | .33 | 15 | 9 | 60 |
| 14 | 10 | | 10 | .35 | .33 | 12 | 4 | 33 |
| 15 | 10 | | 10 | .35 | .67 | 12 | 5 | 42 |

Figure 1B:
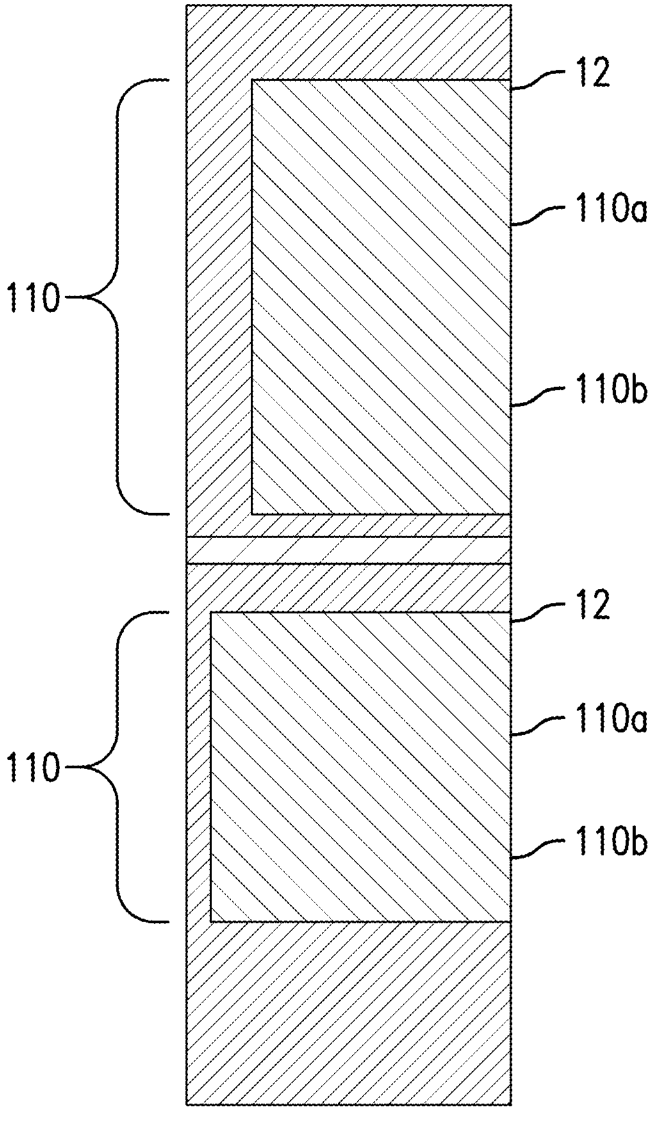

As referenced above, and as illustrated in Table 1, the arrangement of FIGS. 1A and 1B may have the various layers thereof formed of different thicknesses and weights. By way of non-eliminating example, the multidurometer foam layer discussed herein may provide an eighty-four percent effective reduction in forces at a combined thickness of one-half inch, a ninety-percent effective reduction in forces at a combined thickness of three-quarters of an inch, and a ninety-five percent reduction at a combined thickness of one inch. Moreover, the coating thickness on the aramid layer may vary in order to effectuate variations in performance, such as in the range of 1-3 ounces, such as 2.2 ounces, per square yard of aramid material.

Additionally, other layers beyond those illustrated in FIGS. 1A and 1B, or those optionally illustrated in FIGS. 1A and 1B, may be included. For example, additional shielding 120 may be provided at the innermost layer of a panel closest to the body, or at the outmost layer closest to the received force, in order to further shield the body from the received force. Such additional shielding 120 may, by way of non-limiting example, comprise a single or multilayer semi-rigid or rigid polypropylene polymer. This additional layer may have a thickness, by way of non-limiting example, in the range of 0.20-1 mm, and more particularly in the range of 0.35-0.67 mm.

Yet further, the thicknesses of layers independently, as well as in combination, may be varied in certain circumstances. For example, protective equipment having panels inclusive of a multi-durometer layer, may, in certain environments, preferably have minimal thickness. For example, in the event a panel is to be inserted into a helmet, such as in a pliable helmet insert, the desired total thickness of the embodiment described in FIGS. 1A and 1B may be approximately four millimeters, or more preferably, in the range of three millimeters to six millimeters.

Because the disclosed embodiments may provide multi-durometer layers, such as including high-density and low-density foams, in which may correspondingly comprise high durometer and low durometer foams, energy absorption of the provided panels is optimized. This is distinctly contrary to the known art, wherein only low-density/low durometer foam is employed in order to provide maximum comfort. However, because of the high level of deformation suffered by low-density foam, equipment employing only low-density foam compresses so significantly at impact that it does little prevent concussive effect on the body. Contrary to the known art, the disclosed embodiments provide significant comfort even including the use of a high-durometer, such as a four durometer foam, such as in the six to nine pound per cubic foot density range, in part because the high-durometer foam is used in combination with the low-durometer foam such that the thickness of the high-durometer foam is minimized. That is, the disclosed embodiments provide appreciably improved performance through the use of combination of foam densities, i.e., optimal performance is achieved by combining foams of different densities.

Moreover, certain of the layers provided in association with the disclosed protective equipment may have preferred characteristics due to the nature of the remaining layers. By way of non-eliminating example, coating layers provided over the aramid portions specifically may be colored, due to the damage that light can inflict on aramid performance. Yet further, the presence of particular layers may indicate the non-presence of other layers. For example, multiple high-density foam layers may be operationally less desirable than a multi-durometer layer disclosed herein, such as because only single or singular frequencies of impact force may be eliminated by multiple layers having similar or the same uniformity. Further, overly thick coating layers in association with the aramid layer, and/or multiple aramid layers, may be undesirable because forces to be dissipated are instead trapped between layers and allowed to oscillate rather than dissipate. Still further, the order of particular layers in the protective equipment discussed herein may indicate the placement or order of other layers. For example, performance may be degraded significantly if the coated aramid layer is placed in the outermost portion, i.e., most adjacent to the impact, of the disclosed panels.

In a method of selecting the make-up of a multi-layer, multidurometer material that may include multiple layers of foam with different durometers, a coated aramid layer, and optionally a rigid polyurethane layer, the selection of the durometers and thicknesses of the foam and aramid layers may be in a manner that effectively dissipates a broad spectrum of frequencies of received force. Or, the durometers or thicknesses of the foams and the aramid layer may be selected to dissipate a specific range of frequencies of received force.

Those skilled in the art will appreciate that various different aramids may be employed based upon the desired protective effects. For example, KEVLAR® K49 may be employed to optimize vibration absorption; K79 may be employed to minimize stabbing forces; and K29 and K129 may be provided to maximize protection again point impact or ballistics forces.

Those skilled in the art will appreciate various particular embodiments that may be indicated by the aspects discussed herein. For example, the disclosed protective equipment may be or may be included in an athletic shirt 208*a*, which may be lightweight and/or have wicking properties, and wherein such wicking properties do not adversely affect the performance of the aramid layer, at least in part due to the presence of the coating on the aramid layer; the protective equipment may comprise an athletic chest protector 208*b*, such as may be used in lacrosse, cricket, baseball, football, soccer, softball, or the like; or the protective equipment may be provided as a wearable harness, such as through the use of VELCRO® straps or the like. The protective aspects may be stitched into equipment 208 or garments 208, inserted into pre-formed pouches, or otherwise integrated with wearable items. The protective equipment may further be utilized in athletic helmets or headbands, such as for example baseball, football, soccer, lacrosse, or the like.

Figure 2:
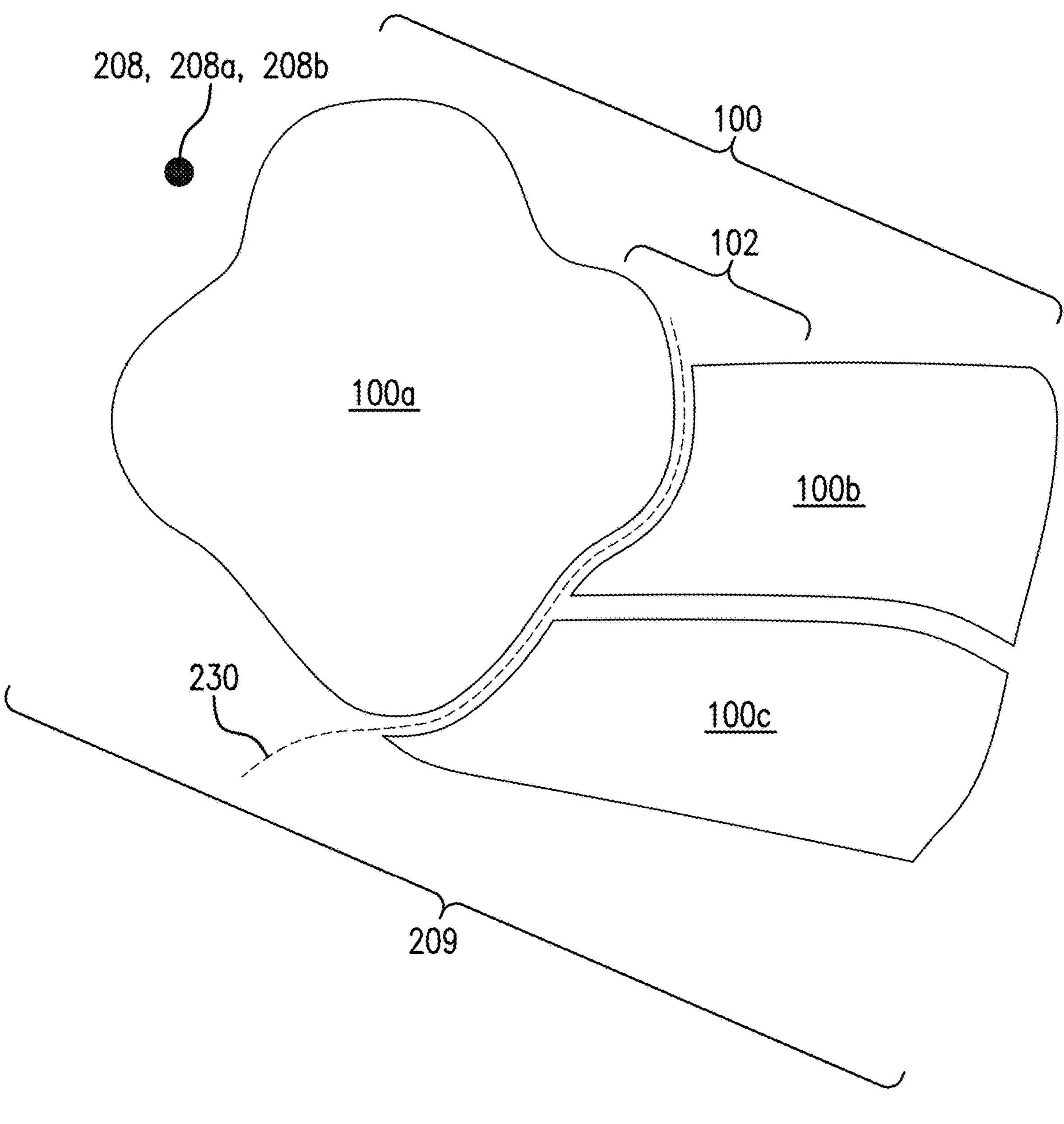
FIG. 2 illustrates an embodiment of an exemplary protective multi-sectional garment pad.

Additionally, a single pad or a panel 100*a*, 100*b*, 100*c* may be provided, as may be multiple pads or panels 100, such as in an interlocking format 100, such as in order to optimize flexibility and mobility in various contexts. By way of non-limiting example, FIG. 2 illustrates protective equipment 208 for association with an athletics shirt, such as may be worn by a baseball pitcher, in which three panels 100*a*, 100*b*, 100*c* are interlocked 230 within a sports shirt 208*a* in order to allow maximum mobility for the athlete wearing the shirt.

Those skilled in the art will further appreciate that, in a multiple panel and/or interlocking panel context, all panels may not be uniform in size or shape, and different ones of the panels may be provided differently in order to optimize protective coverage. By way of non-eliminating example, the two smaller more rectangular pads 100*b*, 100*c* shown in the three panel combination of FIG. 2 may be separately provided from the larger protective panel 100*a* shown in that figure. For example, the two "side" panels 100*b*, 100*c* may be provided via a VELCRO® feature, wherein, a catcher's chest protector, the two side panels may be VELCROED onto a chest protector including the larger panel, and wherein the location of such attachment may vary in order to best protect the wearer's heart 102. Accordingly, chest protectors and like equipment having an integrated protective pad or pads may have additional detachable protective equipment pads that further protect side or other portions of the body, and such detachable pads may be connectible via VELCRO®, snaps, zippers, or like detachable features.

In additional and alternative embodiments, any equipment comprised of the layers discussed herein throughout may additionally be comprised of other layers or protective aspects. By way of non-limiting example, a chest protector may include a pad or pads in accordance with the disclosed aspects only in physical locations correspondent to a prospective commotio cortis event, and may have known, i.e., low density, foam types at other portions of the chest protector, as would be typical of chest protectors in the known art.

In the foregoing detailed description, it can be seen that various features are grouped together in individual embodiments for the purpose of brevity in the disclosure. This method of disclosure is not to be interpreted as reflecting an intention that the subsequently claimed embodiments require more features than are expressly recited in each claim.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather are to be accorded the widest scope consistent with the principles and novel features disclosed herein.

What is claimed is:

1. A protective garment capable of preventing commotio cordis due to a concussive blow to a human cardiac system within a chest of a user human body wearing the protective garment, including a concussive blow to a side aspect of the human cardiac system having a heightened susceptibility to the commotio cordis and which is enclosed particularly within a left-lateral portion the chest of the user, comprising:

- a garment body;
- at least one pouch embedded in the garment body and placed over at least the left- lateral portion and a center of the chest of the user;
- at least one multi sectional pad in the at least one pouch and positioned by wearing of the garment body to specifically cover the human cardiac system at both the center and only the left-lateral portions of the chest, the multi-sectional pad comprising:
  - a first section of the multiple pad sections covering the center of the chest during wearing;
  - a second section and third section of the multiple pad sections being immediately adjacent to one another and being shaped and sized to fit integrally with the first section, and to protect specifically the left-lateral portion of the chest from the wearer' s left side without any contiguous portion thereof covering the center of the chest of the wearer; and
  - the first, second and third sections each comprise at least one foam layer and at least one aramid layer.

2. The protective garment of claim 1, wherein the at least one foam layer comprises a multi-durometer foam having a substantially similar surface area to a surface area of the at least one aramid layer.

3. The protective garment of claim 2, wherein the at least one multi-durometer foam comprises a high-density foam and low-density foam in combination.

4. The protective garment of claim 3, wherein the high density foam has a density in a range of about twelve to about thirty-two pounds per cubic foot.

5. The protective garment of claim 4, wherein the high density foam has a density of about twenty pounds per cubic foot.

6. The protective garment of claim 3, wherein the low density foam has a density of about three to about twelve pounds per cubic foot.

7. The protective garment of claim 6, wherein the low density foam has a density of about nine pounds per cubic foot.

8. The protective garment of claim 2, wherein the at least one multi-durometer foam comprises a nine-pound per cubic foot density foam configured to position outside the human body and configured to locate over the human cardiac system, and a thirty-one pound per cubic foot density foam distally from the human body.

9. The protective garment of claim 1, wherein the at least one aramid layer comprises an elastomeric coating on at least one side thereof.

10. The protective garment of claim 9, wherein the elastomeric coating is colored to prevent damage from light.

11. The protective garment of claim 1, wherein the at least one aramid layer comprises one or more elastomeric components, wherein the one or more elastomeric components comprise randomly distributed nanofibers.

12. The protective garment of claim 1, wherein the first section has at least one of an irregular shape and a cloverleaf shape.

13. The protective garment of claim 1, wherein the first, second and third sections each further comprise at least one shield layer.

14. The protective garment of claim 13, wherein the at least one shield layer is adapted to be most adjacent of the layers to the human cardiac system.

15. The protective garment of claim 13, wherein the at least one shield layer comprises a polypropylene polymer.

16. The protective garment of claim 1, wherein the garment body comprises a lacrosse chest protector.

17. The protective garment of claim 1, wherein the garment body comprises a baseball chest protector.

18. The protective garment of claim 1, wherein the garment body comprises an athletic shirt.

19. The protective garment of claim 18, wherein the athletic shirt comprises a sweat- wicking fabric.

* * * * *